United States Patent [19]

Krauss

[11] 4,239,421

[45] Dec. 16, 1980

[54] VERTICAL SILO FOR FLUID BULK MATERIAL WITH AN INNER BLENDING CHAMBER

[75] Inventor: Werner Krauss, Hamburg, Fed. Rep. of Germany

[73] Assignee: Claudius Peters AG, Hamburg, Fed. Rep. of Germany

[21] Appl. No.: 844,440

[22] Filed: Oct. 21, 1977

[30] Foreign Application Priority Data

Dec. 18, 1976 [DE] Fed. Rep. of Germany ....... 2657596
Dec. 18, 1976 [DE] Fed. Rep. of Germany ....... 2657597

[51] Int. Cl.[3] .............................................. B65G 69/06

[52] U.S. Cl. ...................................... 406/12; 222/195; 366/106; 366/107; 406/90; 406/138

[58] Field of Search ............... 222/193, 195, 564, 630; 302/48, 53, 57; 52/197; 366/106, 107; 406/12, 90, 138

[56] References Cited

U.S. PATENT DOCUMENTS

| | | | |
|---|---|---|---|
| 3,188,144 | 6/1965 | Gmür et al. | 222/195 X |
| 3,758,162 | 9/1973 | Holm et al. | 222/195 X |
| 3,933,394 | 1/1976 | Klein et al. | 302/48 X |
| 3,976,232 | 8/1976 | Heidebrock | 222/193 |
| 3,995,771 | 12/1976 | Olivier | 222/195 X |

FOREIGN PATENT DOCUMENTS

| | | | |
|---|---|---|---|
| 1507888 | 6/1966 | Fed. Rep. of Germany | 222/195 |
| 2133189 | 7/1971 | Fed. Rep. of Germany | 222/195 |

*Primary Examiner*—Robert J. Spar
*Assistant Examiner*—Fred A. Silverberg
*Attorney, Agent, or Firm*—Otto John Munz

[57] ABSTRACT

A blending chamber silo for pulverized bulk material has a main silo chamber with an inlet in its uppermost region, and a centrally located blending chamber on the floor of the silo has a roof and side walls with bottom apertures therein for the influx of the material from the main silo chamber into it. Aeration apparatus and air inlets are provided for the silo floor, and separate homogenization aeration apparatus is provided for the floor of the blending chamber, which operates under a pressure higher than that of the silo aeration apparatus. The roof of the blending chamber is spaced well below the top of the silo, and the blending chamber has a diameter substantially smaller than the diameter of the silo, whereby the lower portion of the silo wall and the wall of the blending chamber define a semi-annular narrow space having a height to width ratio greater than 1:1 and which breaks up material compacted or formed into bridges in its downward path toward the bottom apertures of the chamber. The combined function of the semi-annular narrow space and of the two sets of aeration apparatus of different pressures prevents the material in the semi-annular space from compacting and forming bridges and keeps the homogenizing means free of compacted material. A relief chamber is connected between the blending chamber and outlet from the silo.

14 Claims, 3 Drawing Figures

VERTICAL SILO FOR FLUID BULK MATERIAL WITH AN INNER BLENDING CHAMBER

CROSS REFERENCE TO RELATED APPLICATIONS

Priorities of corresponding German patent applications Nos. P 26 57 596.2 and P 26 57 597.3, each filed on Dec. 18, 1976 are claimed under the Convection.

FIELD OF ART

The invention relates generally to vertical silos for pulverized bulk material, with a main chamber or silo area and an interior pneumatic blending chamber inside the silo area on the silo floor, and an annular space between the walls of the silo and the blending chamber with inlet openings spaced around the circumference of the blending chamber through which the material is fed from the silo area by pneumatically operated aeration means, the floor of the blending chamber being equipped with pneumatically operated homogenization means. (Class 222/193).

DESCRIPTION OF THE PRIOR ART

U.S. Pat. No. 3,976,232 issued Aug. 24, 1976 and German "Auslegeschrift" (laying open) No. 1 507 888 of Nov. 26, 1970 are made of record.

Assignee's prior blending devices of this kind have excellent blending results while requiring moderate investments for the construction and the operation thereof, when careful monitoring means are provided to guarantee a uniformly alternating supply of material from the main silo area into the blending chamber. If such careful monitoring is lacking, or in case of unfavourable circumstances, for instance whenever the flow is inhibited because of the formation of material bridges and their subsequent collapse, the material is not sufficiently pre-mixed when it enters the blending chamber. Less industrialized countries therefore often prefer blending systems such as, for example, homogenizing silos, which require greater investments in construction and operational costs, but which are less complicated and easier to operate.

SUMMARY OF THE INVENTION

The present invention proposes to solve the task of creating a silo of the above described kind, by lowering the requirements of pre-mixing and monitoring without significantly raising the energy consumption during its operation.

The invention is based on the realization that a mere enlargement of the blending chamber relative to the proportions used heretofore will not serve to attain this goal, because the enlargement of the blending chamber is coupled with a corresponding increase of the energy required for homogenization within the blending chamber.

The invention proposes to solve the task at hand of providing a blending silo of the described kind having blending results optionally less dependent on monitoring, which nevertheless require smaller investments for construction and operation than homogenizing silos.

In accordance with the inventive improvements, a semi-annular space is created between the blending chamber wall and the wall of the main silo surrounding it to serve as a feeding conduit for the wall apertures at the bottom of the blending chamber. Material flow interruptions are thus decreased or avoided and a shield is created against disturbances in the material advance in the main silo chamber located above it. This the invention accomplishes by providing a narrow semi-annular channel and by giving it a definite ratio of slenderness in its radial section. The height of the semi-annular channel in its radial section has a certain minimal value relative to its radial dimensions. The effect of this measure is two-fold. First, a change in the flow conditions is achieved whenever the bulk material moves from the main silo area into the semi-annular space. As a result, possibly existing flow disturbances will transfer their effect from the main silo chamber into the semi-annular space. If there should be, for instance, a material bridge formation in the flow, this formation would take place at the cross-over area from the main silo area into the semi-annular space and it would have no effect on the space in the immediate proximity of the wall apertures of the blending chamber. As a rule, as a result of the invention such a bridge formation is dissolved before the material reserve within the semi-annular space below has been consumed. Thus, the invention prevents any difficulties to the supply of the bulk material into the blending chamber, and any bridge formations at the cross-over point from the main silo into the semi-annular channel do not adversely affect the flow. As another result of this invention, advantageous flow conditions can be maintained with relative ease within the semi-annular space inasmuch as the conditions for the aeration of the material inside this semi-annular space are better than those within the main silo area. Because of intensive aeration inside the blending chamber, a certain portion of the aerating air escapes through the wall apertures of the blending chamber and reaches the semi-annular space, and an added lifting effect is caused upon the material in the vicinity of the wall apertures. This influence is stronger in the confined space of the semi-annular space than in the space of the main silo chamber above the blending chamber.

In accordance with the invention the slenderness or narrowing of at least a substantial portion of the semi-annular space in its radial section above the wall apertures is defined as having a ratio of slenderness of 1 or more relative to the size of its inlet from the silo area above the space.

It is not required that the entire semi-annular space outside of the blending chamber be constructed according to the invention, as long as an essential portion of this semi-annular space is constructed accordingly. If, for instance, the blending chamber has a cylindrical wall and a pointed, conical roof portion, merely the area located between the cylindrical wall of the blending chamber and the outer wall of the silo proper must be considered, while the portion which lies radially outside the conical roof of the blending chamber can be discounted.

The slenderness of the annular space in its radial section is determined by various design characteristics. Foremost, they are those characteristics which contribute to the transition from the main silo area into the semi-annular space. Therefore, in the cited definition, the slenderness ratio, which is the quotient of the height of the semi-annular space and of its radial width, as it relates to the radial width of that portion in the upper cross section, at the inlet of the semi-annular space.

As an example, a slenderness ratio of 1 prevails in an annular space with a square radial section. The slimmer this space is, the greater the desired effect. Therefore, a lower limit of the slenderness ratio of 1.5:1 relative to the inlet is preferred.

Thus, in the invention the adjoining width of the semi-annular space below the inlet openings as of primary importance for the steady flow of the material towards the wall openings of the blending chamber. Thus, in a preferred embodiment of the invention, the slenderness ratio as it relates to the mean width of the part of the semi-annular space referred to, is at least 1.8:1 and, preferably, at least 2.5:1. The portion of the semi-annular space under consideration should narrow in the direction downwards to the wall openings of the blending chamber. The mean angle "a" of this contraction therefore should be 60° at the most and preferably a maximum of 45°. In this connection, the mean angle of contraction is the angle between the two straight lines, which in the radial section, may approximately take the place of the contours which radially define the referred to portion of the semi-annular space on its radial outer side and its radial inner side respectively.

In a preferred embodiment of the invention the semi-annular space is essentially cylindrical.

In order to permit the material which is stored above the blending chamber to flow towards the openings of the blending chamber, optionally additional means to move this material are provided, such as pneumatic feeding troughs, or mechanical conveyor means on the roof of the blending chamber. Optionally also are provided openings in the roof of the blending chamber so that part of the material may enter the blending chamber directly.

In accordance with the invention, a peripheral annular zone of the floor of the blending chamber is kept free of homogenization means. This annular zone preferably covers about 10%, and in particular, more than 20% of the entire floor area of the blending chamber, which makes it possible to increase the size of the blending chamber and to decrease the requirements of pre-mixing without significantly raising the energy consumption for the operation of the blending chamber.

An obvious assumption that a decrease in the floor area of the blending chamber equipped with homogenization means would necessarily have to result in a corresponding decrease of the blending efficiency would be in error for the following reasons:

the air which is forced into the blending chamber through the homogenization means, namely a porous brick floor or the like, is under a pressure load from the weight of the material above it. This pressure load decreases with increasing elevation in the material. Thus, the air in rising through the material to be homogenized becomes less compressed and increases in volume. In other words, in the lower area of the blending chamber it is less expanded than in the upper area of the blending chamber. The invention leaves the peripheral area of the blending chamber free of homogenization means and thus achieves firstly that the rising air from the floor area used for homogenization is given a possibility to expand laterally into the space above the peripheral area; and secondly, the area of expansion of the homogenizing air is moved radially inwards and away from the wall apertures of the blending chamber, so that this air no longer presses outwards through these apertures and becomes partially lost for the homogenization process.

In this manner, the invention makes an enlargement of the blending chamber possible without increasing the operational demands at the same ratio as the blending capacity.

Furthermore, the orderly flow of material from the silo area into the blending chamber is enhanced because the expansive pressure of the homogenizing air within the blending chamber is less pronounced in the proximity of the wall apertures, and the material approaching these apertures meets with less resistance at the point of entry.

The fact that the semi-annular zone should be free of pneumatic homogenization means does not signify that no aerating means are to be provided in this zone. On the contrary, to avoid the formation of material embankments or bridges which could easily solidify in time, the aerating means are provided equally to a great advantage within the peripheral annular zone of the blending chamber. Pneumatic aeration means are provided within the silo area to transport the material towards the wall apertures of the blending chamber. They continue through these wall apertures and into the peripheral annular zone. In that manner they perform the desired aeration in the annular zone while at the same time facilitating the introduction of the material from the silo area into the blending chamber. While usually the conventional blending chambers are of conical design, it is advisable according to the invention to make the blending chamber cylindrical so that an expansion above the inactive peripheral annular zone can take effect without being confined by a conical design of that area. This does not exclude the possibility of constructing the ceiling of the blending chamber conically, if in sufficient height, namely in an area where the rising and expanding motion of the material with the homogenizing air has been essentially completed.

DESCRIPTION OF THE PREFERRED EMBODIMENTS

Figure 1:
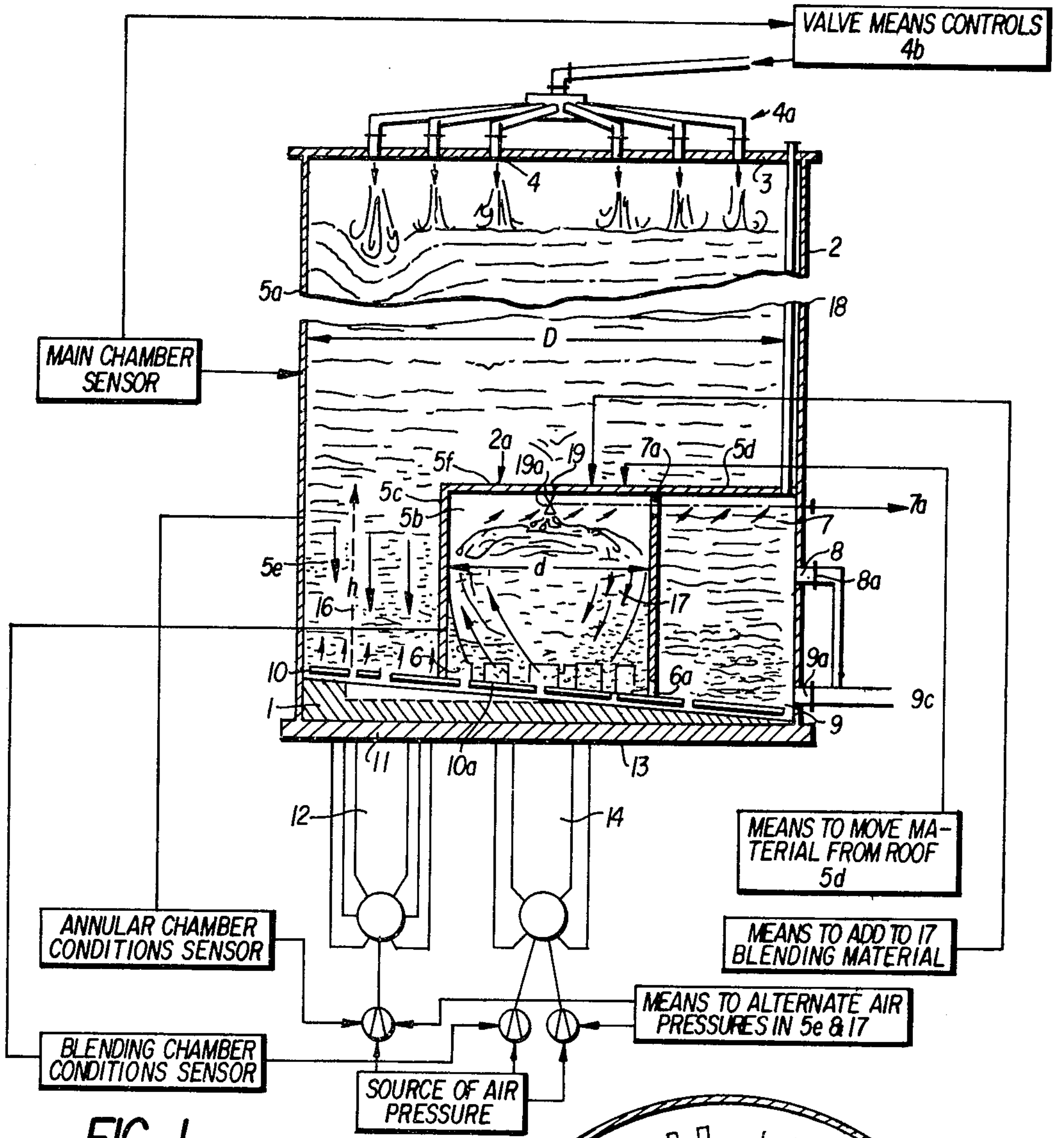
FIG. 1 shows a vertical section.

The silo, preferably of a circular horizontal cross-section, comprises a floor 1, preferably inclined from horizontal toward a lower discharge orifice 9. It is surrounded by a cylindrical wall 2 and capped by a ceiling 3, which has inlet orifices 4, connected through conduits **4*a* with valve means controls 4*b* for a controlled admittance of the materials to be contained in the silo such as by gravity, mechanical conveyors or pneumatically to the silo upper region 5*a*, shown as having a diameter D. Within the lower silo region is located a blending chamber 5*b* and a relief chamber 7. The silo upper region represents the main silo chamber and in that respect, FIG. 1** does not show it to scale, since it is usually considerably higher relative to its diameter D.

The relative dimensions shown with respect to the blending chamber itself, however, are preferably as shown.

The blending chamber is shown centered on a common vertical axis with the silo and has a cylindrical wall **5*c***, having a diameter d, substantially smaller relative to the diameter D of the main silo chamber, with the relief chamber adjoining it.

A common flat roof **5*d***, shown as horizontal by example only, separates the main silo chamber from the blending and relief chambers. A conically shaped roof is also feasible.

Thus, there is created a semi-annular space 5e between the main chamber and the blending chamber.

The vertical wall of the blending chamber has inlet orifices 6 leading through it from the main silo chamber, which are located at the common floor level, preferably equidistantly spaced from each other. Transit orifices 6a are provided from the blending chamber into the relief chamber.

Thus, the material proceeds from the main chamber through the inlet orifices into the blending chamber and from there it is discharged through the relief chamber and the upper and lower outlet orifices 8 and 9, respectively, to its following destination 9c.

At the cross-sectional plane adjacent the roof 5d, where the material is ducted from the main chamber area 5a into the semi-annular space 5e, the cross-section of the flow becomes considerably narrower. The possible resulting difficulties, however, occur at a relatively great distance from the wall apertures 6. As a result of the arrangements of this invention any interruption of the flow of the material by the formation of material bridges and the subsequent waves of pressure when the bridges collapse, experienced by the prior art, either do not affect the flow of material through the wall apertures 6 inside the blending chamber 5b, or affect it to a much lesser degree than in known conventional blending silos, and the conditions of flow into the semi-annular space 5e are influenced more easily and more advantageously by aeration and by the air escaping through the wall apertures 6, than the material in the main silo area in proximity to conventional smaller blending chambers, because the aeration within the semi-annular space is more concentrated and symmetrical.

Thus, in accordance with the invention the silo and the material transit require less monitoring for the maintenance of a uniform flow of material into the blending chamber, and a danger that the blending operation may be interrupted by difficulties of flow in the main silo area is largely avoided. Construction costs are also decreased and the processing of the material is speeded up. The drawing shows relative dimensions for the area of the semi-annular space substantially to scale and these may be considered as correct for a preferred embodiment. The relation of the diameters is optimally in the range of $$d/D = 0.35\text{–}0.65, \text{ and preferably } 0.4\text{–}0.55$$

For the clearance of the blending chamber, which is about the same as the height h of the annular space, the preferred values are:

$$h/D = 0.4\text{–}0.8, \text{ and preferably } 0.5\text{–}0.7.$$

Disregarding the thickness of the walls, which are inconsequential, the slenderness ratio of S in the following range results:

$$S = 1.5\text{–}3.6, \text{ and preferably } 1.7\text{–}3.1.$$

These numbers give the slenderness ratio as it relates to the width of the inlet of the semi-annular space at the upper relevant rim of the blending chamber. The mean slenderness ratios are identical when these figures are applied and when the walls 1 and 5c are of a cylindrical shape. They are greater when the annular space has a conical outer demarcation.

The floor of the main silo area surrounding the blending chamber 5 is equipped with pneumatic aeration means 10 shown as pneumatic conveyor ducts 11, which are circumferentially spaced and extending radially towards the center of the silo. The conveyor ducts extend through the wall apertures 6 into the inside of the blending chamber. Aeration means 10 and ducts 11 are connected to a compressor system 12 for pressure supply. The floor of the blending chamber is equipped with means 13 for supply of finely distributed compressed air, which, for claim purposes is defined as homogenization means 13. Preferably, it is different from the aeration means 10 and ducts 11, in that the compressor system 14 corresponding thereto is capable of supplying greater amounts of compressed air, sufficient to create a bubbling turbulence. The aeration means 10,11 and the homogenization means 13 are connected in sections separately to the respective compressor systems so that they may be operated in an alternating pattern. Automatic controls therefore getting impulses from density sensors are an optional improvement.

Figure 2:
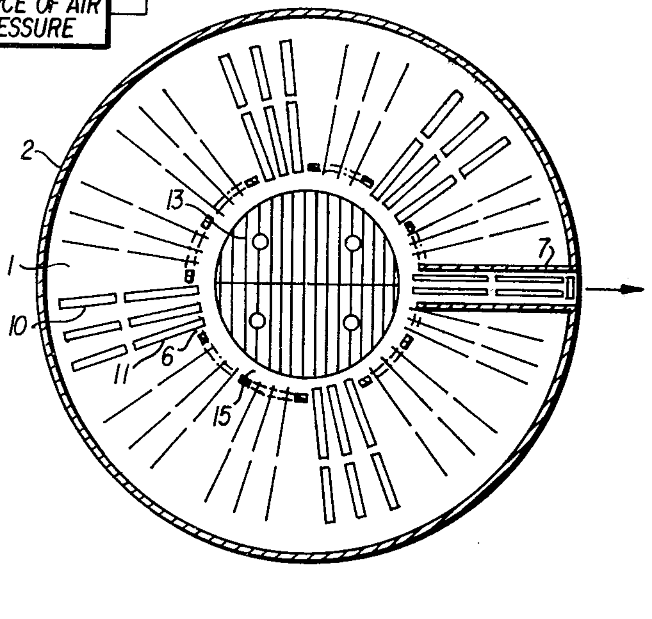
FIG. 2 shows a horizontal section through the silo as seen towards the bottom.

Contrary to conventional homogenization means located on the entire floor area of a silo and as far as the inner surfaces of the lateral walls of the blending chamber, the present invention locates them radially as shown on FIG. 2, somewhat retracted from the inner lateral walls of the blending chamber, thus creating an outer annular zone 15 of the blending chamber which is free of homogenization means. This annular zone, however, is partially occupied by the aerating means 11 which enter that zone through the apertures 6. During the operation of the blending chamber the sections of its floor area are alternately supplied with highly compressed air so that a strong air current rises from these sections, as is indicated with large arrows 16 in FIG. 1. The air rises with the expanding material, which subsequently sinks down again in the less aerated regions 17 of the blending chamber. The rising air becomes less concentrated and increases in volume. The invention utilizes this circumstance by permitting the expansion area of the material in the blending chamber, as indicated with arrows 16 in FIG. 1, to extend upwardly in a pear-shaped volume above the floor of the annular zone 15. The aerating air then escapes beneath the ceiling of the blending chamber into the relief chamber 7 through orifices 7a and is piped out through pipe 18.

The direction of the arrows as drawn in FIG. 1 indicates that the wall apertures 6 are located at a certain distance from the area where the homogenizing air increases in volume so that less air is lost from the blending chamber by escaping into the main silo area. In addition, the material entering the blending chamber through these apertures encounters a diminished resistance.

Aeration means 5f can be provided on the roof of the blending chamber. At least one aperture 19 with a valve 19a are shown, in the center of the roof to permit entry of a portion of the material stored above the blending chamber so that it may be introduced into the blending chamber in addition to the material which enters through the wall apertures 6.

The definition of the "annular zone" is not to be limited to a circular zone shown. It defines a radial distancing of the homogenization means from the wall of the blending chamber and the wall apertures of the blending chamber. These distances may vary, but preferably they should be uniform.

The relation of the height to the diameter of the blending chamber is preferably above 1:1 and still more preferably above 1:3. The aerating air introduced escapes above the level of the fine-grained material. It expands through the relief chamber and the vertical ventilation pipe 18 connected thereto.

Continuous withdrawal of the material can take place either from discharge opening 9 in the silo bottom area or from the opening 8 in the silo wall located above the bottom opening. The blending chamber permits the homogenization process to affect larger amounts of raw powder as an advance mixing phase. The formation of mixing twirls in the main silo chamber, caused by the sectional material exchange brought about by the controlled aeration in the annular zones also is aided. Both of these measures permit a control of even extensive fluctuations and fairly great deviations in the process, so that the quality of mixtures produced by this system at least equals that of a conventional homogenization plant. The additional advantages are in utilization of gravity for the entire mixing process, by far superior to that of the prior art and resulting in reduced operating expenses and in considerable savings of total investment, because of the compact construction of a one-story silo.

Optionally, in order to make use of the streams of the material inside the main silo chamber, an additional controllable feeding mechanism 20 is added to bring the raw material directly into the homogenization chamber through an aperture in the ceiling of the blending chamber. Thus, as an additional improvement the possibility is provided to feed—if desired—another component into the blending chamber. Thus, for instance, corrections of the chemical composition of the material are possible.

The aeration floor of the homogenization chamber preferably is divided into sections.

This feeding is achieved by sectional aeration of their outer annular region. The effect of gravity causes the material to be fed into the blending chamber, where complete fluidization and homogenization takes place, requiring relatively minor pressure differences and little air because the pressure decreases relative to the main column of the silo contents. It is within the scope of the invention to utilize the variable physical states of powdered substances under the influence of different aeration pressures and volumes to limit the height of the fluidization level within the homogenization chamber, so that overcharging is avoided.

For these reasons automatic controls are optionally provided.

These include a main silo chamber pressure sensor, which is connected to and controls the valve means controls 4a to deliver a desired preset amount of material in response to the actual pressure of the main chamber. A pressure and density sensor is included which collects and compares the pressures or the densities of the semi-annular space with those of the blending chamber and in turn controls by its output the respective supplies of pressurized air to these areas. Means are provided to alternate the supply of air to the semi-annular space and to the blending chamber as preset or desired.

By the arrangements disclosed, the outer annular zone of the floor of the blending chamber is kept free of the influence of the homogenization means. Preferably, this free zone is to cover at least 10% and preferably about 20% of the floor area of the blending chamber.

Figure 3:
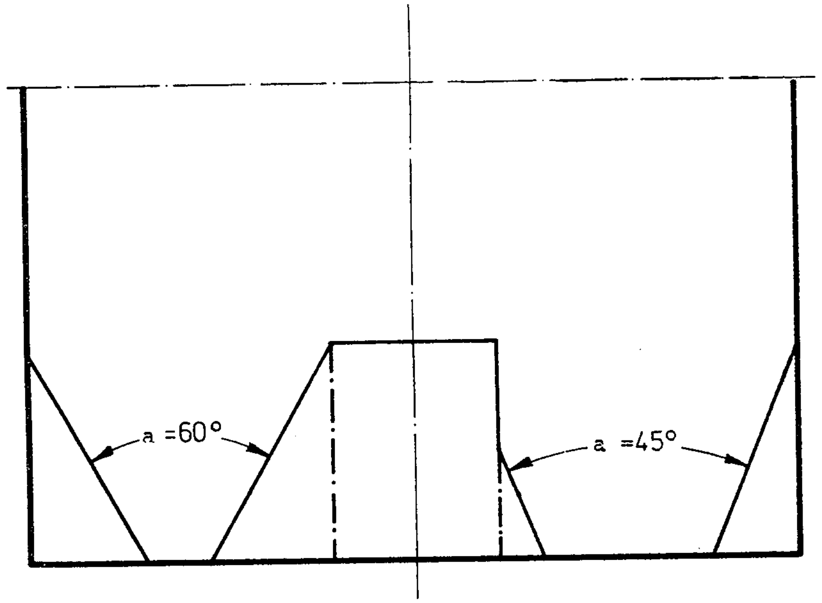
FIG. 3 is a cross sectional view depicting an angle of contraction "a".

FIG. 3 depicts the downward narrowing of the wall of the silo with the wall of the blending chamber having the shape of a frustum of a cone so that the median angle of narrowing "a" in the left half of the drawing is about 60°; the right half of FIG. 3 depicts a similar example, the median angle "a" being about 45°.

Preferably the total annular zone is to be supplied by the aeration means. The pneumatic aeration means 10,11 in the silo area may extend through the wall apertures 6 into the annular zone of the blending chamber.

Aerating means 10,11, as shown on FIG. 2 partially in complete outline and partially schematically in single lines, indicate alternating conditions of aeration, and are not to be interpreted as showing differences in the arrangement of these means, or in the density of their spacing. The definition "homogenization means" is not to be understood as limiting these means to a particular type of an aeration device but to encompass all homogenization and all types of aeration means suitable for the blending of materials in a blending chamber which supply air to expand inside the blending chamber.

The above inventive design and relationships between the parts of the silo are superior in construction and in results to those of the prior art.

What is claimed is:

1. A silo for fluid bulk material, comprising:

a vertical silo wall enclosure having a floor at its bottom and a cap closing its top; said silo wall enclosure having at least one silo outlet orifice at its bottom; at least one valve controlled material inlet opening in the silo cap for supplying material to the silo; a vertical blending chamber of dimensions substantially smaller than those of the silo, and arranged centrally on the silo floor; said blending chamber having a roof and a side wall spaced radially inwardly from the silo wall enclosure, defining a narrow semi-annular space therewith; a plurality of passages formed through the blending chamber side wall at its bottom for conducting material from the silo into the blending chamber; aeration means to supply pressurized air through the floor of the silo; homogenization means to supply pressurized air through the floor of the blending chamber, an outer annular zone of the floor of the blending chamber being free of the homogenization means, defining a passive zone, whereby pressurized air introduced into the blending chamber spaced radially inwardly from the side wall of the blending chamber is enabled to expand outwardly into the passive zone spaced above the passages formed through the blending chamber side wall, said outer annular zone occupying at least 10% of the entire floor area of the blending chamber;

said blending chamber having aeration means separate from the aeration means of the silo floor;

a source of air pressure;

ducts with valve means connected to the aeration means of the silo floor area;

ducts with valve means connected to the aeration means of the floor of the blending chamber;

means to alternate air pressures in the silo floor and in the blending chamber floor;

means to sense the conditions in the silo chamber and the blending chamber, respectively; and means to control the admittance of pressures to the silo floor and to the blending chamber floor, respectively, in response to the variations in the pressures between the main chamber and the blending chamber.

2. A silo as claimed in claim 1, further comprising valve means controls for the material delivery into the main chamber and means to control the material delivery valve means by the outputs of the means to sense the conditions in the main silo chamber.

3. A silo as claimed in claim 1, further comprising means to inject additional materials into the blending chamber.

4. A silo as claimed in claim 1, wherein the ratio of the height to the width of the semi-annular space is in the range of 1.5:1 to 3.6:1.

5. A silo as claimed in claim 1, wherein the ratio of the height to the width of the semi-annular space is in the range of 1.7:1 to 3.1:1.

6. A silo as claimed in claim 1, wherein the wall of the blending chamber is cylindrical throughout its height.

7. A silo as claimed in claim 1, wherein auxiliary means is on the roof of the blending chamber to introduce material from the silo into the blending chamber through the roof of the blending chamber.

8. A silo as claimed in claim 1, further comprising a relief chamber extending between the wall of said blending chamber and the silo wall enclosure; a plurality of material transit orifices at the bottom of the wall of the blending chamber, communicating the blending chamber with the relief chamber; and said silo outlet orifice comprises upper and lower silo discharge openings from the relief chamber, said upper and lower silo discharge openings being in communication with the relief chamber.

9. A silo as claimed in claim 1, wherein the floor area of the annular zone is greater than 20% of the floor area of the blending chamber.

10. A silo as claimed in claim 1, wherein the aeration means is also in the floor of the semi-annular space.

11. A silo as claimed in claim 10, wherein the aeration means extends from the floor of the semi-annular space through the passages and into the annular zone of the blending chamber.

12. A silo as claimed in claim 11, wherein the blending chamber is cylindrical.

13. A silo as claimed in claim 1, wherein the ratio of the diameter of the blending chamber to the diameter of the silo wall enclosure is within the range of 0.35 to 0.65.

14. A silo as claimed in claim 1, wherein the ratio of the height of the blending chamber to the diameter of the silo wall enclosure is in the range of 0.4 to 0.8.

* * * * *